US012524933B2

(12) United States Patent
Wang et al.

(10) Patent No.: US 12,524,933 B2
(45) Date of Patent: Jan. 13, 2026

(54) PHARMACEUTICAL HYPERSPECTRAL RECONSTRUCTION METHOD BASED ON CODED APERTURE SNAPSHOT SPECTRAL IMAGING SYSTEM

(71) Applicant: Hunan University, Changsha (CN)

(72) Inventors: Yaonan Wang, Changsha (CN); Zhongwei Chen, Changsha (CN); Jianxu Mao, Changsha (CN); Hui Zhang, Changsha (CN); Caiping Liu, Changsha (CN); Xuesan Su, Changsha (CN); Hui Miao, Changsha (CN); Yurong Chen, Changsha (CN); Ating Yin, Changsha (CN); Bingrui Zhao, Changsha (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 19/245,915

(22) Filed: Jun. 23, 2025

(65) Prior Publication Data
US 2025/0322568 A1    Oct. 16, 2025

Related U.S. Application Data

(63) Continuation of application No. PCT/CN2024/079028, filed on Feb. 28, 2024.

(30) Foreign Application Priority Data

Mar. 24, 2023    (CN) .......................... 202310298901.2

(51) Int. Cl.
*G06T 11/00*    (2006.01)

(52) U.S. Cl.
CPC ........ *G06T 11/006* (2013.01); *G06T 2210/22* (2013.01); *G06T 2211/441* (2023.08)

(58) Field of Classification Search
CPC ............... G06T 11/006; G06T 2210/22; G06T 2211/441
See application file for complete search history.

(56) References Cited

U.S. PATENT DOCUMENTS

| 2012/0105844 | A1* | 5/2012 | Brady ................... G01J 3/2823 356/310 |
| 2013/0094717 | A1* | 4/2013 | Janni .................... G06V 10/143 382/110 |
| 2022/0309288 | A1* | 9/2022 | Uljanovs ............. G06F 18/2431 |

FOREIGN PATENT DOCUMENTS

| CN | 109887050 A | * | 6/2019 | |
| CN | 112241937 A | * | 1/2021 | ........... G06F 18/214 |
| CN | 114092509 A |   | 2/2022 | |

OTHER PUBLICATIONS

ISA (CNIPA), Written Opinion of the International Searching Authority (WO/ISA) for PCT/CN2024/079028, May 29, 2024.
Claims of PCT/CN2024/079028, Feb. 28, 2024.

* cited by examiner

*Primary Examiner* — Daniel F Hajnik
*Assistant Examiner* — Chris Alejandro Puntier
(74) *Attorney, Agent, or Firm* — Zhigang Ma (57) ABSTRACT

A pharmaceutical hyperspectral reconstruction method based on a coded aperture snapshot spectral imaging (CASSI) system includes: collecting and processing original pharmaceutical hyperspectral images to obtain augmented pharmaceutical hyperspectral images; performing simulated spatial encoding on the augmented pharmaceutical hyperspectral images to obtain encoded measurement images; performing spectral inverse shift on the encoded measurement images, then performing inverse encoding to obtain inversely encoded three-dimensional hyperspectral images, using the augmented pharmaceutical hyperspectral images as target images, and constructing a training set and a testing (Continued)

set according to the inversely encoded three-dimensional hyperspectral images and the target images; constructing a deep symmetric neural reconstruction network, and training and testing the deep symmetric neural reconstruction network; and deploying a tested deep symmetric neural reconstruction network onto the CASSI system, real-time collecting pharmaceutical measurement images using the snapshot coded imaging system, and performing computational reconstruction on the pharmaceutical measurement images to obtain reconstructed three-dimensional hyperspectral images.

9 Claims, 4 Drawing Sheets

PHARMACEUTICAL HYPERSPECTRAL RECONSTRUCTION METHOD BASED ON CODED APERTURE SNAPSHOT SPECTRAL IMAGING SYSTEM

CROSS-REFERENCE TO RELATED APPLICATIONS

This application is a continuation of International Patent Application No. PCT/CN2024/079028, filed Feb. 28, 2024, which claims the priority of Chinese Patent Application No. 202310298901.2, filed Mar. 24, 2023, both of which are herein incorporated by reference in their entirety.

TECHNICAL FIELD

The disclosure relates to the field of hyperspectral image reconstruction, and more particularly to a pharmaceutical hyperspectral reconstruction method based on a coded aperture snapshot spectral imaging (CASSI) system.

BACKGROUND

At present, for the quality inspection of pharmaceutical products produced by pharmaceutical automated production line process, chemical titration and visual inspection using red, green, blue (RGB) cameras are mostly used at home and abroad. The chemical titration not only requires training professional laboratory personnel, wasting a lot of financial and material resources, and greatly increasing production costs for enterprises, but also takes a long time, which severely impacts production efficiency. Although the visual inspection using the RGB cameras liberates labor and can partially meet the requirements for pharmaceutical safety and quality inspections, the RGB cameras can only capture RGB images composed of red, green, and blue channels, which only contain spatial information and lack spectral features. Therefore, the visual inspection using the RGB cameras is unable to meet the requirements for analysis of components, concentrations, and other critical parameters, which greatly limits the inspection capabilities. In contrast, hyperspectral imaging is an advanced emerging technology that integrates traditional two-dimensional imaging techniques with spectroscopy. By utilizing unique reflectance characteristics of materials, it samples the spectral reflectance of a scene and captures detailed spectral distributions of the scene, thereby to obtain a three-dimensional data cube that simultaneously integrates spatial and spectral information, known as a three-dimensional hyperspectral image. The hyperspectral imaging can achieve integrated, rapid, non-destructive, and precise measurement of multiple inspection parameters of pharmaceuticals, including quality, composition, concentration, visible foreign matter, clarity, uniformity, and dissolution rate.

Snapshot compressive spectral imaging modulates three-dimensional hyperspectral data onto a two-dimensional (2D) detector through multiplexing techniques. This can simultaneously capture spatial and spectral information in a single sampling, effectively avoiding motion artifacts and making high-speed hyperspectral imaging possible. Therefore, researching how to computationally reconstruct a three-dimensional hyperspectral image from a two-dimensional measurement image is an urgent problem that needs to be solved.

Because observed values obtained from a CASSI system are projections of original data, equation unknowns for reconstructing three-dimensional hyperspectral data from collected two-dimensional measurement images are greater than a number of equations, and solutions are not unique, making it a highly ill-posed problem. At present, traditional algorithms known in the field include greedy iterative algorithms, convex optimization algorithms, and evolutionary algorithms. However, these algorithms rely on empirically derived priors that struggle to capture complex spectral characteristics of real-world scenes, thereby reducing the quality of reconstructed images.

Algorithms based on deep learning can implicitly learning priors, as well as spectral-spatial similarities and structural similarities from external databases to enhance an initial solution and obtain a final reconstructed solution. At present, learning-based algorithms have been applied in fields such as remote sensing, plant spectroscopy, and medical imaging, there is a scarcity of research in the field of image reconstruction for the pharmaceutical products. Therefore, how to efficiently reconstruct pharmaceutical hyperspectral data using the CASSI system has become a problem that those skilled in the art are dedicated to solving.

SUMMARY

To overcome the shortcomings in the related art, the disclosure provides a pharmaceutical hyperspectral reconstruction method based on a CASSI system, including the following steps:

S1, collecting original pharmaceutical hyperspectral images using hyperspectral cameras, preprocessing the original pharmaceutical hyperspectral images to obtain preprocessed pharmaceutical hyperspectral images, and performing data augmentation on the preprocessed pharmaceutical hyperspectral images to obtain augmented pharmaceutical hyperspectral images;

S2, performing simulated spatial encoding on the augmented pharmaceutical hyperspectral images to obtain encoded measurement images;

S3, performing spectral inverse shift on the encoded measurement images, followed by performing inverse encoding to obtain inversely encoded three-dimensional hyperspectral images, using the augmented pharmaceutical hyperspectral images as target images, jointly using the inversely encoded three-dimensional hyperspectral images and the target images as a dataset for supervised training, and constructing a training set and a testing set according to the dataset;

S4, constructing a deep symmetric neural reconstruction network, training the deep symmetric neural reconstruction network using the training set, adjusting a network loss of the deep symmetric neural reconstruction network, performing backpropagation on the deep symmetric neural reconstruction network to update network parameters of the deep symmetric neural reconstruction network, thereby to obtain a trained deep symmetric neural reconstruction network, and testing the trained deep symmetric neural reconstruction network using the testing set to obtain a tested deep symmetric neural reconstruction network; and S5, deploying the tested deep symmetric neural reconstruction network onto the coded aperture snapshot spectral imaging system, real-time collecting pharmaceutical measurement images using the coded aperture snapshot spectral imaging system, and performing computational reconstruction on the pharmaceutical measurement images to obtain reconstructed three-dimensional hyperspectral images.

In an embodiment, the pharmaceutical hyperspectral reconstruction method based on the CASSI system is executed by one or more processors and further includes: obtaining distribution information of components within a pharmaceutical tablet by analyzing a reconstructed three-dimensional hyperspectral image of the pharmaceutical tablet, superposing the distribution information of components onto the reconstructed three-dimensional hyperspectral image to obtain a superposed three-dimensional hyperspectral image, and displaying the superposed three-dimensional hyperspectral image on a display screen to thereby assist related personnel to determine whether the pharmaceutical tablet is standard.

In an embodiment, in the step S1, the collecting original pharmaceutical hyperspectral images using hyperspectral cameras, preprocessing the original pharmaceutical hyperspectral images to obtain preprocessed pharmaceutical hyperspectral images includes the following steps:

S11, presetting a band, a band interval and a hyperspectral image size to obtain a preset band, a preset band interval and a preset hyperspectral image size;

S12, collecting the original pharmaceutical hyperspectral images using the hyperspectral cameras, selecting and combining, according to the preset band and the preset band interval, a plurality of band images from each of the original pharmaceutical hyperspectral images to obtain combined pharmaceutical hyperspectral images corresponding to the original pharmaceutical hyperspectral images respectively, and cropping, according to the preset hyperspectral image size, the combined pharmaceutical hyperspectral images to obtain cropped pharmaceutical hyperspectral images;

S13, calculating an average clarity of each of the cropped pharmaceutical hyperspectral images; and S14, sorting, according to the average clarity of each of the cropped pharmaceutical hyperspectral images, the cropped pharmaceutical hyperspectral images in descending order, and selecting a top 80% of the cropped pharmaceutical hyperspectral images as the preprocessed pharmaceutical hyperspectral images.

In an embodiment, in the step S13, a formula of the calculating an average clarity of each of the cropped pharmaceutical hyperspectral images is as follows:

$$D(f) = \sum_i \sum_y \sum_x |f_i(x+2, y) - f_i(x, y)|^2 \div N$$

where D(f) represents an average clarity of a f-th cropped pharmaceutical hyperspectral image, $f_i(x,y)$ represents a grayscale value of a pixel (x,y) corresponding to a i-th band image in the f-th cropped pharmaceutical hyperspectral image, $f_i(x+2,y)$ represents a grayscale value of a pixel (x+2,y) corresponding to the i-th band image in the f-th cropped pharmaceutical hyperspectral image, N represents a number of bands in the f-th cropped pharmaceutical hyperspectral image, and i=1, 2, ..., N.

In an embodiment, in the step S1, the performing data augmentation on the preprocessed pharmaceutical hyperspectral images to obtain augmented pharmaceutical hyperspectral images includes the following steps:

S15, rotating two-dimensional images corresponding to channels in the preprocessed pharmaceutical hyperspectral images by a preset rotation angle to obtain rotated hyperspectral images;

S16, concatenating the preprocessed pharmaceutical hyperspectral images with corresponding rotated hyperspectral images to obtain mixed hyperspectral images; and S17, performing a plurality of random crops on the mixed hyperspectral images to obtain a plurality of cropped mixed hyperspectral images, and using the plurality of cropped mixed hyperspectral images as the augmented pharmaceutical hyperspectral images.

In an embodiment, in the step S2, the performing simulated spatial encoding on the augmented pharmaceutical hyperspectral images to obtain encoded measurement images includes the following steps:

S21, randomly establishing a two-dimensional physical mask containing 0 and 1;

S22, according to a mathematical model of coded aperture snapshot spectral imaging and the two-dimensional physical mask, performing the simulated spatial encoding on the augmented pharmaceutical hyperspectral images to obtain spatially encoded pharmaceutical hyperspectral images;

S23, performing spectral shift on the spatially encoded pharmaceutical hyperspectral images to obtain tilted data cubes; and S24, performing band fusion on the tilted data cubes and adding salt-and-pepper noise to the tilted data cubes to obtain the encoded measurement images.

In an embodiment, the step S3 includes the following steps:

S31, performing the spectral inverse shift on the encoded measurement images to obtain inversely shifted measurement images;

S32, performing the inverse encoding on the inversely shifted measurement images to obtain the inversely encoded three-dimensional hyperspectral images;

S33, using the augmented pharmaceutical hyperspectral images as the target images, and jointly using the inversely encoded three-dimensional hyperspectral images and the target images as the dataset for the supervised training; and S34, allocating 80% of the dataset as the training set for training the deep symmetric neural reconstruction network, and allocating 20% of the dataset as the testing set for testing the deep symmetric neural reconstruction network.

In an embodiment, in the step S31, a formula of the performing the spectral inverse shift on the encoded measurement images to obtain inversely shifted measurement images is as follows:

$$X_{start}(:, :, c_n) = y(:, n \times \lambda_s : n \times \lambda_s + H + C - 1 - (n-1) \times \lambda_s)$$

where $\lambda_s$ represents an inverse shift step length, $X_{start} \in R^{C \times W \times H}$ represents the inversely shifted measurement images, H represents a height of a preprocessed pharmaceutical hyperspectral image, C represents a number of bands of the preprocessed pharmaceutical hyperspectral image, W represents a width of the preprocessed pharmaceutical hyperspectral image, R represents a real number, $c_n$ represents a n-th band, and $c_n$=1, 2, ..., C.

In an embodiment, in the step S32, a formula of the performing the inverse encoding on the inversely shifted measurement images to obtain the inversely encoded three-dimensional hyperspectral images is as follows:

$$X^1_{start}(:, :, c_n) = X_{start}(:, :, c_n) \cdot * M`$$

where $M` = 1/M$ where M represents the two-dimensional physical mask, M' represents a two-dimensional inverse physical mask, and $$X^1_{start}$$

represents the inversely encoded three-dimensional hyperspectral images.

In an embodiment, the deep symmetric neural reconstruction network in the step S4 includes a first residual network, a first spatial-spectral attention mechanism reconstruction module, a feature refinement module, a second spatial-spectral attention mechanism reconstruction module and a second residual network sequentially connected in that order; the first residual network is configured to extract features of the inversely encoded three-dimensional hyperspectral images, the first spatial-spectral attention mechanism reconstruction module is configured to capture global non-local spatial-spectral similarities of the inversely encoded three-dimensional hyperspectral images, the feature refinement module is configured to capture contextual feature maps of the inversely encoded three-dimensional hyperspectral images, the second spatial-spectral attention mechanism reconstruction module is configured to weight each entry of the contextual feature map to reconstruct spatial-spectral information, and the second residual network is configured to learn residual information between an input and an output and progressively refine the features.

In an embodiment, in the step S1, the original pharmaceutical hyperspectral images include hyperspectral data with a band in a range of 300 nanometers (nm) to 2400 nm.

The pharmaceutical hyperspectral reconstruction method based on the CASSI system is provided. This method first expands a number of samples through the data augmentation to improve the generalization and robustness of the model. Then the augmented pharmaceutical hyperspectral images are subjected to the simulated spatial encoding to obtain reference measurement images. According to dispersion and spatial encoding principles of the CASSI system, these measurement images are processed through the spectral inverse shift and the inverse encoding to achieve a mapping from three-dimensional data to three-dimensional data. An improved deep reconstruction network, which integrates spectral-spatial attention mechanisms and the feature refinement module, is employed for reconstruction. Finally, the reconstruction network is deployed onto the CASSI system to realize snapshot acquisition and computational reconstruction of pharmaceutical hyperspectral images.

DETAILED DESCRIPTION OF EMBODIMENTS

In order to make those skilled in the art better understand the technical solution of the disclosure, a further detailed description of the disclosure is provided below in conjunction with the attached drawings.

A pharmaceutical hyperspectral reconstruction method based on a CASSI system includes the following steps.

S1, original pharmaceutical hyperspectral images are collected using hyperspectral cameras and then preprocessed to obtain preprocessed pharmaceutical hyperspectral images. The preprocessed pharmaceutical hyperspectral images are subjected to data augmentation to obtain augmented pharmaceutical hyperspectral images.

S2, the augmented pharmaceutical hyperspectral images are subjected to simulated spatial encoding to obtain encoded measurement images.

S3, the encoded measurement images are subjected to spectral inverse shift and then subjected to inverse encoding to obtain inversely encoded three-dimensional hyperspectral images. The augmented pharmaceutical hyperspectral images are used as target images. The inversely encoded three-dimensional hyperspectral images and the target images are jointly used as a dataset for supervised training. A training set and a testing set are constructed according to the dataset.

S4, a deep symmetric neural reconstruction network is constructed. The deep symmetric neural reconstruction network is trained using the training set. A network loss of the deep symmetric neural reconstruction network is adjusted, and backpropagation is performed on the deep symmetric neural reconstruction network to update network parameters of the deep symmetric neural reconstruction network, thereby to obtain a trained deep symmetric neural reconstruction network. The network parameters include weights and biases. The trained deep symmetric neural reconstruction network is tested using the testing set to obtain a tested deep symmetric neural reconstruction network.

S5, the tested deep symmetric neural reconstruction network is deployed onto the CASSI system. Pharmaceutical measurement images are real-time collected using the CASSI system. Computational reconstruction is performed on the pharmaceutical measurement images to obtain reconstructed three-dimensional hyperspectral images.

Figure 1:
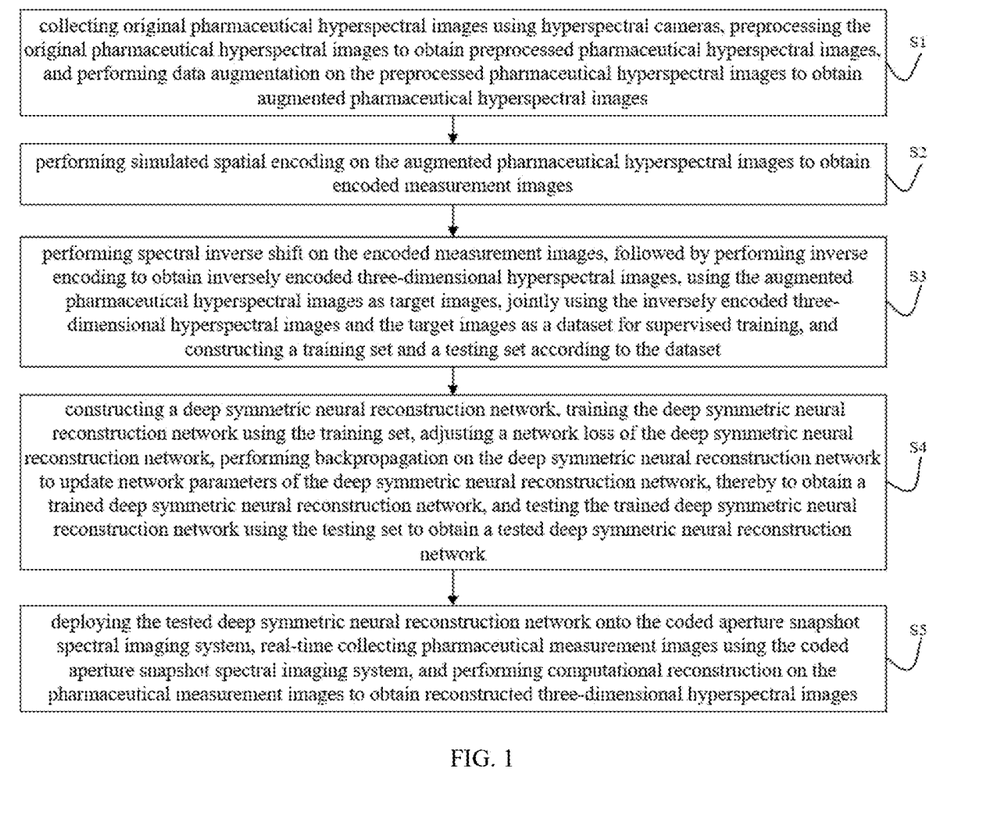
FIG. 1 illustrates a flowchart of a pharmaceutical hyperspectral reconstruction method based on a CASSI system according to an embodiment of the disclosure.

Specifically, referring to FIG. 1, FIG. 1 is a flowchart of the pharmaceutical hyperspectral reconstruction method based on the CASSI system according to an embodiment of the disclosure.

Specifically, the pharmaceutical hyperspectral reconstruction method based on the CASSI system includes the following.

At first, the original pharmaceutical hyperspectral images are collected using the hyperspectral cameras. Specifically, pharmaceuticals to be inspected is uniformly placed on a black baseplate of a Dualix hyperspectral sorting instrument. A speed of a conveyor belt is set, and eight sets of illumination sources are symmetrically arranged in a circumferential form. Two hyperspectral cameras, one for a visible light band and another for a near-infrared light band, are used to capture images separately. It should be noted that in this step, the two hyperspectral cameras are positioned at a certain distance apart. After the pharmaceuticals to be inspected are conveyed to the hyperspectral camera for the visible light band, the speed of the conveyor belt is reduced and then increased to match a speed of the hyperspectral camera for the near-infrared light band within an interval distance. Therefore, original pharmaceutical hyperspectral images corresponding to the pharmaceuticals respectively are captured in a raw format. Furthermore, the original pharmaceutical hyperspectral images include hyperspectral data with a band in a range of 300 nm to 2400 nm. The hyperspectral data with this band includes both visible light and near-infrared light, most pharmaceutical features and impurity features can be effectively distinguished within this band.

Subsequently, the original pharmaceutical hyperspectral images are subjected to preprocessing and the data augmentation to obtain the augmented pharmaceutical hyperspectral images. The augmented hyperspectral images are subjected to the simulated spatial encoding to obtain the encoded measurement images. Next, the encoded measurement images are subjected to the spectral inverse shift and then subjected to the inverse encoding to obtain the inversely encoded three-dimensional hyperspectral images. The augmented hyperspectral images are used as the target images corresponding to the inversely encoded three-dimensional hyperspectral images. The inversely encoded three-dimensional hyperspectral images and the target images are jointly used as the dataset for the supervised training. The training set and the testing set are constructed according to the dataset.

Next, the deep symmetric neural reconstruction network is constructed. The deep symmetric neural reconstruction network is trained using the training set. The network loss of the deep symmetric neural reconstruction network is adjusted, and the backpropagation is performed on the deep symmetric neural reconstruction network to update the network parameters of the deep symmetric neural reconstruction network, thereby to obtain the trained deep symmetric neural reconstruction network. The trained deep symmetric neural reconstruction network is tested using the testing set to obtain the tested deep symmetric neural reconstruction network.

Finally, the tested deep symmetric neural reconstruction network is deployed onto the CASSI system. The pharmaceutical measurement images are real-time collected using the CASSI system. The computational reconstruction is performed on the pharmaceutical measurement images to obtain the reconstructed three-dimensional hyperspectral images, thereby achieving snapshot collection and computational reconstruction of pharmaceutical hyperspectral data. Unlike mainstream hyperspectral cameras, the CASSI system employs a principle of compressive sensing, utilizing optical components such as an objective lens, a prism, a charge-coupled device (CCD) detector, and a physical mask to trade time for space. This system is capable of capturing a single snapshot, resulting in two-dimensional compressed measurement values that are pharmaceutical measurement images.

In an embodiment, in the step S1, the original pharmaceutical hyperspectral images are collected using the hyperspectral cameras and then preprocessed to obtain the preprocessed pharmaceutical hyperspectral images, which includes the following steps.

S11, a band, s band interval, and a hyperspectral image size are preset to obtain a preset band, a preset band interval and a preset hyperspectral image size.

S12, the original pharmaceutical hyperspectral images are collected using the hyperspectral cameras. Multiple band images are selected from each of the original pharmaceutical hyperspectral images according to the preset band and the preset band interval. The multiple band images are combined to obtain combined pharmaceutical hyperspectral images corresponding to the original pharmaceutical hyperspectral images respectively. According to the preset hyperspectral image size, the combined pharmaceutical hyperspectral images are cropped to obtain cropped pharmaceutical hyperspectral images.

S13, an average clarity of each of the cropped pharmaceutical hyperspectral images is calculated.

S14, according to the average clarity of each of the cropped pharmaceutical hyperspectral images, the cropped pharmaceutical hyperspectral images are sorted in descending order, and a top 80% of the cropped pharmaceutical hyperspectral images are selected as the preprocessed pharmaceutical hyperspectral images.

In the step S13, the average clarity of each of the cropped pharmaceutical hyperspectral images is calculated according to a formula as follows:

$$D(f) = \sum_i \sum_y \sum_x |f_i(x+2, y) - f_i(x, y)|^2 \div N$$

where D(f) represents an average clarity of a f-th cropped pharmaceutical hyperspectral image, $f_i(x,y)$ represents a grayscale value of a pixel (x,y) corresponding to a i-th band image in the f-th cropped pharmaceutical hyperspectral image, $f_i(x+2,y)$ represents a grayscale value of a pixel (x+2,y) corresponding to the i-th band image in the f-th cropped pharmaceutical hyperspectral image, N represents a number of bands in the f-th cropped pharmaceutical hyperspectral image, and i=1, 2, ..., N.

Specifically, the original pharmaceutical hyperspectral images are preprocessed to obtain the preprocessed pharmaceutical hyperspectral images, the specific process is as follows.

The preset band is in a range of 300 nm to 580 nm, and the preset band interval is 10 nm. Therefore, the numbers of the bands N can be calculated to be 28, ensuring clear image discrimination for each band image. Considering pixel occupancy of pharmaceutical Products, the preset hyperspectral image size is 256*56 to maximize the display of all features of the pharmaceutical products. In addition, a format of the original pharmaceutical hyperspectral images is converted to .mat format to match subsequent processing steps.

A band with a range of 300 nm to 580 nm is extracted from each of the original pharmaceutical hyperspectral images. Then 28 band images are extracted with the preset band interval of 10 nm. The 28 band images are recombined to obtain a combined pharmaceutical hyperspectral image. A 256*256 rectangular box is used to define a centered pharmaceutical region, and then the combined pharmaceutical hyperspectral image is cropped to obtain a cropped pharmaceutical hyperspectral image with a size of 256*256*28.

The average clarity of each of the cropped pharmaceutical hyperspectral images is calculated according to the formula as follows:

$$D(f) = \sum_i \sum_y \sum_x |f_i(x+2, y) - f_i(x, y)|^2 \div N$$

where D(f) represents the average clarity of the f-th cropped pharmaceutical hyperspectral image, $f_i(x,y)$ represents the grayscale value of the pixel (x,y) corresponding to the i-th band image in the f-th cropped pharmaceutical hyperspectral image, $f_i(x+2,y)$ represents the grayscale value of the pixel (x+2,y) corresponding to the i-th band image in the f-th cropped pharmaceutical hyperspectral image, N represents the number of the bands in the f-th cropped pharmaceutical hyperspectral image, and i=1, 2, . . . , N.

According to the average clarity of each of the cropped pharmaceutical hyperspectral images, the cropped pharmaceutical hyperspectral images are sorted in the descending order, and the top 80% of the cropped pharmaceutical hyperspectral images are selected to obtain the preprocessed pharmaceutical hyperspectral images with a centered pharmaceutical region and a uniform size.

In the embodiment, in the step S1, the preprocessed pharmaceutical hyperspectral images are subjected to the data augmentation to obtain the augmented pharmaceutical, which includes the following steps.

S15, two-dimensional images corresponding to channels in the preprocessed pharmaceutical hyperspectral images are rotated by a preset rotation angle to obtain rotated hyperspectral images.

S16, the preprocessed pharmaceutical hyperspectral images are concatenated with corresponding rotated hyperspectral images to obtain mixed hyperspectral images.

S17, the mixed hyperspectral images are subjected to multiple random crops to obtain multiple cropped mixed hyperspectral images, and the multiple cropped mixed hyperspectral images are used as the augmented pharmaceutical hyperspectral images.

Specifically, when a number of samples is limited, the data augmentation can be performed on the preprocessed pharmaceutical hyperspectral images to obtain multiple data samples. For each of the preprocessed pharmaceutical hyperspectral images, two-dimensional images of sizes C*W*H corresponding to the channels are rotated by a same angle, such as 90°, 180°, and 270°, thereby to obtain three rotated two-dimensional images of sizes C*W*H. The three rotated images are then concatenated with original two-dimensional images (i.e., the two-dimensional images corresponding to the channels have not been rotated) to form a mixed hyperspectral image of a size 2C*2W*H. The mixed hyperspectral image is subsequently subjected to the multiple random crops to obtain multiple cropped mixed hyperspectral images of a size C*W*H, which are used as the augmented pharmaceutical hyperspectral images.

In the embodiment, in the step S2, the augmented pharmaceutical hyperspectral images are subjected to the simulated spatial encoding to obtain the encoded measurement images, which includes the following steps.

S21, a two-dimensional physical mask containing 0 and 1 is randomly established.

S22, according to a mathematical model of CASSI and the two-dimensional physical mask, the augmented pharmaceutical hyperspectral images are subjected to the simulated spatial encoding to obtain spatially encoded pharmaceutical hyperspectral images.

S23, the spatially encoded pharmaceutical hyperspectral images are subjected to spectral shift to obtain tilted data cubes.

S24, the tilted data cubes are subjected to band fusion and are added with salt-and-pepper noise to obtain the encoded measurement images.

Specifically, the augmented pharmaceutical hyperspectral images are subjected to the simulated spatial encoding to obtain the encoded measurement images, the specific process is as follows.

1), the two-dimensional physical mask M containing 0 and 1 is randomly established, and a size of the two-dimensional physical mask is W*H.

2), the augmented pharmaceutical hyperspectral images are multiplied with the two-dimensional physical mask M to perform the simulated spatial encoding, thereby to obtain the spatially encoded pharmaceutical hyperspectral images, and a specific formula for the spatially encoded pharmaceutical hyperspectral images is as follows:

$$Y(:, :, c_n) = X(:, :, c_n) \cdot * M$$

where $c_n$=1, . . . , C, which represents n bands ranging from 1 to C, •* represents element-wise multiplication of matrices; $X \in R^{C \times W \times H}$ represents the augmented pharmaceutical hyperspectral images, M represents the two-dimensional physical mask, and $Y \in R^{C \times W \times H}$ represents spatially encoded data cubes, that is, the spatially encoded pharmaceutical hyperspectral image.

3), each channel of the spatially encoded pharmaceutical hyperspectral images is shifted by a specific number of pixels along a width direction to obtain the tilted data cubes Y', and a specific formula for the tilted data cubes Y' is as follows:

$$Y'(u, v, c_n) = Y(x, y + k(\lambda_n - \lambda_c), c_n)$$

where (u,v) represents planar coordinates of a detector in the coded aperture snapshot spectral imaging system, $\lambda_n$ represents a wavelength of a n-th channel, $\lambda_c$ represents a center wavelength that does not change direction after dispersion, k($\lambda_n-\lambda_c$) represents a spatial shift amount of the n-th channel, Y'$\in R^{C\times W\times(H+k(\lambda_n-\lambda_c)-1)}$ represents the tilted data cubes after shifting, and x and y respectively represent a horizontal coordinate and a vertical coordinate of each of the spatially encoded data cubes Y.

4), pixel values in all bands of the tilted data cubes Y' are summed and integrated, and the salt-and-pepper noise is added to simulate real-world environmental disturbances, thereby to obtain simulated observation values y, which are also the encoded measurement images y. A specific formula for the encoded measurement images y is as follows:

$$y = \sum_{c_n=1}^{C} Y'(:,:,c_n) + Z$$

where Z represents the salt-and-pepper noise, E represents summation, and Y' represents the tilted data cubes.

In the embodiment, the specific process of the step S3 is as follows.

S31, the encoded measurement images are subjected to the spectral inverse shift to obtain inversely shifted measurement images.

S32, the inversely shifted measurement images are subjected to the inverse encoding to obtain the inversely encoded three-dimension hyperspectral images.

S33, the augmented pharmaceutical hyperspectral images are used as the target images, and the inversely encoded three-dimensional hyperspectral images and the target images are jointly used as the dataset for the supervised training.

S34, 80% of the dataset is allocated as the training set for training the deep symmetric neural reconstruction network, and 20% of the dataset is allocated as the testing set for testing the deep symmetric neural reconstruction network.

In the embodiment, in the step S31, the encoded measurements images are subjected to the spectral inverse shift to obtain the inversely shifted measurement images, and a specific formula for the inversely shifted measurement images is as follows:

$$X_{start}(:,:,c_n) = y(:, n\times\lambda_s:n\times\lambda_s+H+C-1-(n-1)\times\lambda_s)$$

where $\lambda_s$ represents an inverse shift step length, $X_{start}\in R^{C\times W\times H}$ represents the inversely shifted measurement images, H represents a height of a preprocessed pharmaceutical hyperspectral image, C represents a number of bands of the preprocessed pharmaceutical hyperspectral image, W represents a width of the preprocessed pharmaceutical hyperspectral image, $c_n$ represents a n-th band, and $c_n$=1, 2, ..., C.

In the embodiment, in the step S32, the inversely shifted measurement images are subjected to the inverse encoding to obtain the inversely encoded three-dimension hyperspectral images, and a specific formula for the inversely encoded three-dimension hyperspectral images is as follows:

$$X^1_{start}(:,:,c_n) = X_{start}(:,:,c_n)\cdot *M`$$

where $M` = 1/M$ where M represents the two-dimensional physical mask, M' represents a two-dimensional reverse physical mask, and $$X^1_{start}$$

represents the inverse encoded three-dimensional hyperspectral images.

The Specific process is as follows.

1) According to a dispersion offset principle of a disperser in the CASSI system for encoded spectrum, the simulated measurement values y (i.e., the encoded measurement images) are subjected to the spectral inverse shift to obtain the inversely shifted measurement images. A specific formula for the inversely shifted measurement images is as follows:

$$X_{start}(:,:,c_n) = y(:, n\times\lambda_s:n\times\lambda_s+H+C-1-(n-1)\times\lambda_s)$$

where $\lambda_s$ represents the inverse shift step length, $X_{start}\in R^{C\times W\times H}$ represents the inversely shifted measurement images, H represents the height of the preprocessed pharmaceutical hyperspectral image, C represents the number of the bands of the preprocessed pharmaceutical hyperspectral image, W represents the width of the preprocessed pharmaceutical hyperspectral image, $c_n$ represents the n-th band, and $c_n$=1, 2, ..., C.

The simulated observation values y are processed to the spectral inverse shift, that is, after offsetting the simulated observation values y by a corresponding spatial distance along a dispersion direction in each channel, the three-dimensional data cubes that is consistent in size with the corresponding augmented pharmaceutical hyperspectral images are extracted, which are the inversely shifted measurement images $X_{start}$.

2) According to a spatial encoding principle of the CASSI system, the inversely shifted measurement images $X_{start}$ are subjected to the inverse encoding to obtain three-dimensional data cubes that contain the two-dimensional physical mask and the simulated observation value. These three-dimensional data cubes are used as the inversely encoded three-dimensional hyperspectral images $$X^1_{start}.$$

The formula for the inversely encoded three-dimensional hyperspectral images $$X^1_{start}$$

is as follows:

$$X^1_{start}(:,:,c_n) = X_{start}(:,:,c_n)\cdot *M`$$

where $M` = 1/M$ where M' represents the two-dimensional reverse physical mask, which is obtained by taking the reciprocal of all elements in the two-dimensional physical mask M, and $X^1_{start}$ represents the inversely encoded three-dimensional hyperspectral images, with a same size as the augmented pharmaceutical hyperspectral images.

3) The augmented pharmaceutical hyperspectral images are used as the target images, which serves as labels. Both the inversely encoded three-dimensional hyperspectral images and the target images are combined to form the dataset. 80% of the dataset is allocated as the training set for training parameters of the deep symmetric neural reconstruction network, and 20% of the dataset is allocated as the testing set for evaluating the performance of the parameters.

In the embodiment, the deep symmetric neural reconstruction network in the step S4 includes a first residual network, a first spatial-spectral attention mechanism reconstruction module, a feature refinement module, a second spatial-spectral attention mechanism reconstruction module and a second residual network sequentially connected in that order. The first residual network is configured to extract features of the inversely encoded three-dimensional hyperspectral images. The first spatial-spectral attention mechanism reconstruction module is configured to capture global non-local spatial-spectral similarities of the inversely encoded three-dimensional hyperspectral images. The feature refinement module is configured to capture contextual feature maps of the inversely encoded three-dimensional hyperspectral images. The second spatial-spectral attention mechanism reconstruction module is configured to weight each entry of the contextual feature map to reconstruct spatial-spectral information. The second residual network is configured to learn residual information between an input and an output and progressively refine the features. In an embodiment, each of the first spatial-spectral attention mechanism reconstruction module, the feature refinement module, the second spatial-spectral attention mechanism reconstruction module are embodied by at least one processor and at least one memory coupled to the at least one processor, and the at least one memory stores computer programs executable by the at least one processor.

Figure 2:
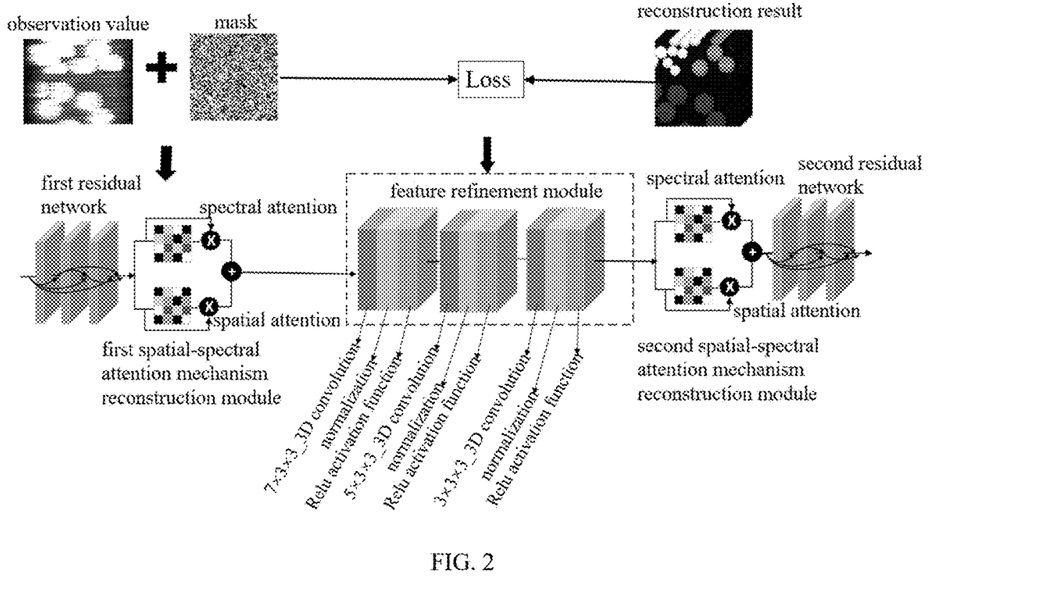
FIG. 2 illustrates a schematic diagram of a network structure of a deep symmetric neural reconstruction network according to the embodiment of the disclosure.

Specifically, referring to FIG. 2, FIG. 2 is a schematic diagram of a network structure of the deep symmetric neural reconstruction network according to the embodiment of the disclosure.

In FIG. 2, the deep symmetric neural reconstruction network includes the first residual network, the first spatial-spectral attention mechanism reconstruction module, the feature refinement module, the second spatial-spectral attention mechanism reconstruction module and the second residual network sequentially connected in that order. The deep symmetric neural reconstruction network uses a residual network as its framework, and constructs the feature refinement module and the spatial-spectral attention mechanism reconstruction modules for supervised training. A network structure of the first residual network is same as that of the second residual network, and a network structure of the first spectral-spatial attention mechanism reconstruction module is same as that of the second spectral-spatial attention mechanism reconstruction module.

The first residual network is configured to extract the features of the inversely encoded three-dimensional hyperspectral images, extracting aliased image information and encoded information. The first spatial-spectral attention mechanism reconstruction module is configured to capture the global non-local spatial-spectral similarities of the inversely encoded three-dimensional hyperspectral images by integrating spatial attention output features with spectral attention features. Specifically, a spatial attention channel calculates spatial similarity, and a spectral attention calculate spectral similarity. The feature refinement module is configured to capture the contextual feature maps of the inversely encoded three-dimensional hyperspectral images using a three cascaded multi-scale three-dimensional convolution instead of a traditional two-dimensional convolution. The second spatial-spectral attention mechanism reconstruction module is configured to adaptively weight each entry of the contextual feature map to effectively reconstruct the spatial-spectral information. The second residual network is configured to learn the residual information between the input and the output and progressively refine representation of the features, thereby effectively avoiding gradient vanishing.

Skip connections of the first residual network and the second residual network are used to learn the residual information between the input and the output, the representation of the features is progressively refined, and knowledge across multiple stages is accumulated. This can avoid the gradient vanishing caused by the deep symmetric neural reconstruction network being too deep. This can be specifically quantified as follows:

$$F^{(k+1)} = F^{(0)} + f_{Res}(F^{(k)})$$

where $F^{(k)}$ represents an output of a k-th residual layer, which also serves as an input of a (k+1)-th residual layer, $F^{(0)}$ represents an original input of a residual network, $F^{(k+1)}$ represents an output of the (k+1)-th residual layer, and $f_{Res}$ represents a mathematical operator of the k-th residual layer.

Spectral-spatial attention mechanisms used in both the first and the second spectral-spatial attention reconstruction modules adopt a combined output of the spatial attention features and the spectral attention features. By solving for a spectral attention matrix and a spatial attention matrix respectively, weight coefficients are obtained. These coefficients determine a weight proportion of each feature, thereby extracting and capturing the global non-local spatial-spectral similarities.

Figure 3:
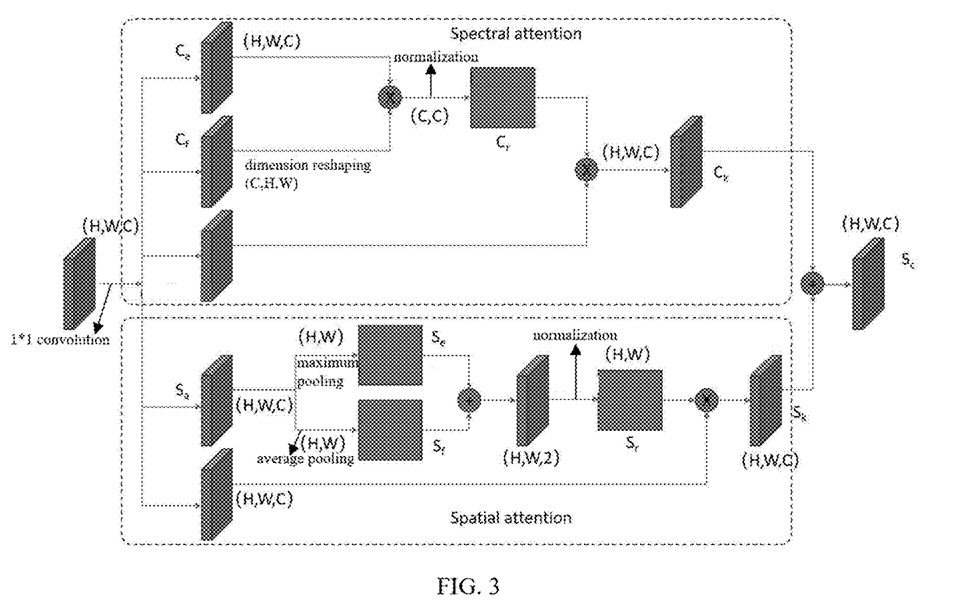
FIG. 3 illustrates a schematic diagram of a computational process of a first spatial-spectral attention mechanism reconstruction module according to the embodiment of the disclosure.

Specifically, referring to FIG. 3, FIG. 3 is a schematic diagram of a computational process of the first spatial-spectral attention mechanism reconstruction module according to the embodiment of the disclosure.

Taking the first spectral-spatial attention mechanism module as an example, and the computational process is as follows.

$x \in R^{H \times W \times C}$ is set as an input of the first spectral-spatial attention mechanism module.

In the spectral attention mechanism, the input $x \in R^{H \times W \times C}$ is subjected to 1×1 convolution, convolution, and a reshaping operation to obtain a key matrix $C_e$ with a size of $R^{H \times W \times C}$ and a query matrix $C_f$ with a size of $R^{C \times H \times W}$. Formulas for the two matrices are as follows:

$$C_e = f_{reshape}(f_{conv1}(x))$$

$$C_f = f_{conv2}(x)$$

where $f_{conv1}$ and $f_{conv2}$ both represent 1×1 convolution operations, and $f_{reshape}$ represents dimension reshaping.

A dot product of the key matrix $C_e$ and the query matrix $C_f$ is calculated, then a softmax operation is performed on the dot product to obtain a spectral attention matrix $C_r$, and $C_r \in R^{C \times C}$. A formula for the spectral attention matrix $C_r$ is as follows:

$$C_r = f_{softmax}(f_{conv2}(x) \times f_{reshape}(f_{conv1}(x)))$$

The input $x \in R^{H \times W \times C}$ is subjected to a 1×1 convolution operation and then multiplied by the spectral attention matrix $C_r$ to obtain a spectral attention-weighted matrix $C_k$. A formula of the spectral attention-weighted matrix $C_k$ is as follows:

$$C_k = f_{conv3}(x) \times C_r$$

where $f_{conv3}$ represents the 1×1 convolution operation.

In the spatial attention mechanism, the input $x \in R^{H \times W \times C}$ is subjected to a 1×1 convolution operation to obtain a nonlinear convolution matrix $S_a \in R^{H \times W \times C}$. Then a maximum pooling (MaxPool) operation and an average pooling (AvgPool) operation based on spectral channels are respectively performed on the nonlinear convolution matrix to obtain a maximum pooling matrix $S_e$ and an average pooling matrix $S_f$. Formulas of the maximum pooling matrix $S_e$ and the average pooling matrix $S_f$ are as follows:

$$S_e = f_{Max}(S_a)$$

$$S_f = f_{Avg}(S_a)$$

where $S_e$ represents the maximum pooling matrix, $S_f$ represents the average pooling matrix, $f_{Max}$ represents the maximum pooling operation, $f_{Avg}$ represents the average pooling operation, and $S_a$ represents the nonlinear convolution matrix.

The maximum pooling matrix $S_e$ and the average pooling matrix $S_f$ are summed, then convolution compression is performed, followed by a softmax operation to obtain a spatial attention matrix $S_r$. A formula of the spatial attention matrix $S_r$ is as follows:

$$S_r = f_{softmax}(f_{conv4}(S_f + S_e))$$

where $S_r$ represents the spatial attention matrix, $f_{conv4}$ represents a 7×7 convolution operation, and $f_{softmax}$ represents the softmax operation.

The input $x \in R^{H \times W \times C}$ is subjected to a 1×1 convolution operation and then multiplied by the spatial attention matrix $S_r$ to obtain a spatial attention-weighted matrix $S_k$. A formula of the spatial attention-weighted matrix $S_k$ is as follows:

$$S_k = S_r \cdot * f_{conv5}(x)$$

where $f_{conv5}$ represents the 1×1 convolution operation.

The spectral attention-weighted matrix $C_k$ and the spatial attention-weighted matrix $S_k$ together form an output matrix $S_c$ of the first spectral-spatial attention mechanism reconstruction module. A formula of the output matrix $S_c$ is as follows:

$$S_c = C_k + S_k$$

Finally, the feature refinement module adopts a three-layer cascaded three-dimensional convolutional neural network to deeply extract residual spectral-spatial information.

A computational process of the second spectral-spatial attention mechanism module is same to that of the first spectral-spatial attention mechanism module, and thus will not be reiterated here.

According to a peak signal-to-noise ratio (PSNR) and a structural similarity index measure (SSIM) of the reconstructed images output by the deep symmetric neural reconstruction on the testing set, final performance of the deep symmetric neural reconstruction network is assessed. It is determined whether the reconstruction quality meets the criteria. If the reconstruction quality meets the criteria, the tested deep symmetric neural reconstruction network is deployed onto the CASSI system, thereby enabling snapshot acquisition and computational reconstruction of pharmaceutical hyperspectral images. Conversely, if the reconstruction quality is not meet the criteria, the deep symmetric neural reconstruction network undergoes additional supervised training and its final performance is tested on the testing set until the reconstruction quality meets the criteria.

Figure 4:
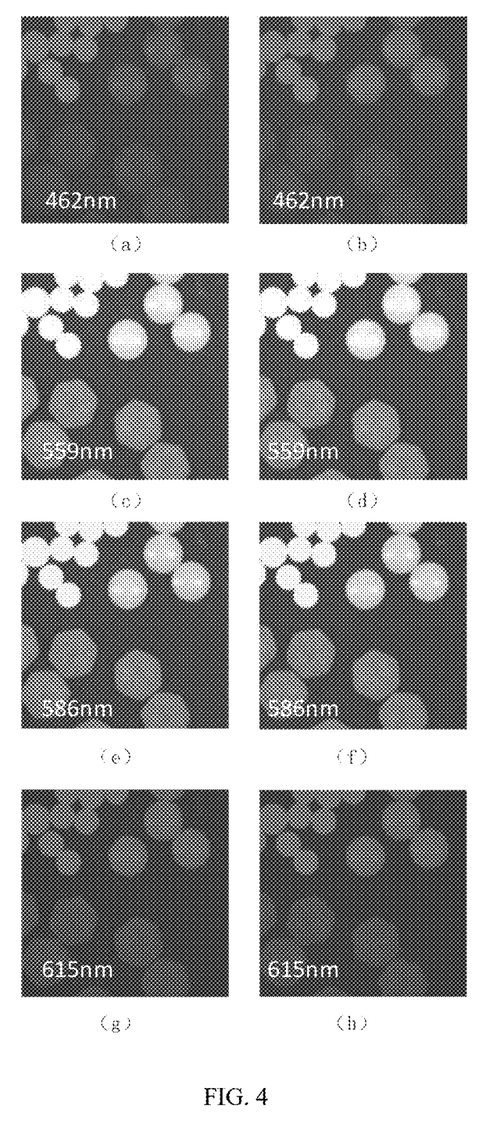
FIG. 4 illustrates a comparison diagram of reconstruction results of a pharmaceutical tablet according to the embodiment of the disclosure. Specifically, (a), (c), (e), and (g) in FIG. 4 represent original images of the pharmaceutical tablet at wavelengths of 462 nm, 559 nm, 586 nm, and 615 nm, respectively; (b), (d), (f), and (h) in FIG. 4 represent reconstructed images of the pharmaceutical tablet at the wavelengths of 462 nm, 559 nm, 586 nm, and 615 nm, respectively.
Figure 5:
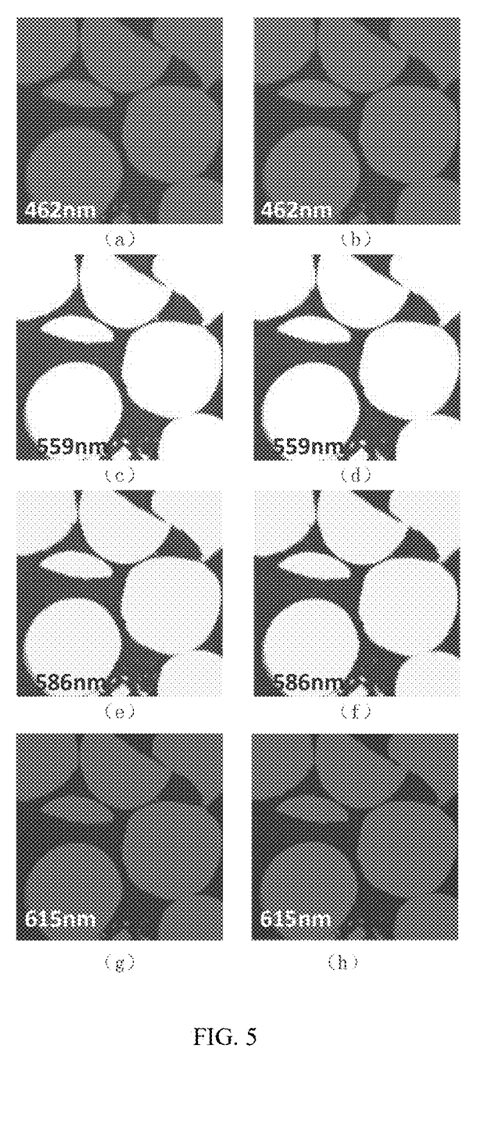
FIG. 5 illustrates a comparison diagram of reconstruction results of a pharmaceutical material according to the embodiment of the disclosure. Specifically, (a), (c), (e), and (g) in FIG. 5 represent original images of the pharmaceutical material at the wavelengths of 462 nm, 559 nm, 586 nm, and 615 nm, respectively; (b), (d), (f), and (h) represent reconstructed images of the pharmaceutical material at the wavelengths of 462 nm, 559 nm, 586 nm, and 615 nm, respectively.

Referring to FIG. 4 and FIG. 5, FIG. 4 is a comparison diagram of reconstruction results of a pharmaceutical tablet according to the embodiment of the disclosure. FIG. 5 is a comparison diagram of reconstruction results of a pharmaceutical material according to the embodiment of the disclosure.

As shown in FIG. 4 and FIG. 5, the reconstructed results of each of the pharmaceutical hyperspectral images across various wavelengths demonstrate excellent visual details without noticeable blurring, aliasing, or color distortion. Furthermore, the reconstructed images of the pharmaceutical tablet in FIG. 4 achieves a PSNR of 39.56 decibel (dB) and an SSIM of 0.982. The reconstructed images of the pharmaceutical material in FIG. 5 achieves a PSNR of 41.88 dB and an SSIM of 0.990. These results indicate a high degree of similarity to the corresponding original three-dimensional pharmaceutical hyperspectral images.

The pharmaceutical hyperspectral reconstruction method based on the CASSI system first adopts the data augmentation to increase the number of the samples, thereby enhancing generalization capability and robustness of the model. Then the augmented pharmaceutical hyperspectral images are subjected to the simulated spatial encoding to obtain reference measurement images. According to dispersion and spatial encoding principles of CASSI system, these measurement images are processed through the spectral inverse shift and the inverse encoding to achieve a mapping from three-dimensional data to three-dimensional data. An improved deep reconstruction network, which integrates spectral-spatial attention mechanisms and the feature refinement module, is employed for reconstruction. Finally, the reconstruction network is deployed onto the CASSI system to realize snapshot acquisition and computational reconstruction of pharmaceutical hyperspectral images.

The pharmaceutical hyperspectral reconstruction method based on the CASSI system provided by the disclosure has been described in detail above. Specific examples have been used in this paper to illustrate the principles and implementation of the disclosure. The description of the above embodiments is intended only to help understand the core idea of the disclosure. It should be pointed out that for those skilled in this field, several improvements and modifications can be made to the disclosure without departing from the principles of the disclosure, and these improvements and modifications also fall within the scope of protection of the claims of the disclosure.

What is claimed is:

1. A pharmaceutical hyperspectral reconstruction method based on a coded aperture snapshot spectral imaging system, comprising the following steps:
    S1, collecting original pharmaceutical hyperspectral images using hyperspectral cameras, preprocessing the original pharmaceutical hyperspectral images to obtain preprocessed pharmaceutical hyperspectral images, and performing data augmentation on the preprocessed pharmaceutical hyperspectral images to obtain augmented pharmaceutical hyperspectral images;
    S2, performing simulated spatial encoding on the augmented pharmaceutical hyperspectral images to obtain encoded measurement images;
    S3, performing spectral inverse shift on the encoded measurement images, followed by performing inverse encoding to obtain inversely encoded three-dimensional hyperspectral images, using the augmented pharmaceutical hyperspectral images as target images, jointly using the inversely encoded three-dimensional hyperspectral images and the target images as a dataset for supervised training, and constructing a training set and a testing set according to the dataset;
    S4, constructing a deep symmetric neural reconstruction network, training the deep symmetric neural reconstruction network using the training set, adjusting a network loss of the deep symmetric neural reconstruction network, performing backpropagation on the deep symmetric neural reconstruction network to update network parameters of the deep symmetric neural reconstruction network, thereby to obtain a trained deep symmetric neural reconstruction network, and testing the trained deep symmetric neural reconstruction network using the testing set to obtain a tested deep symmetric neural reconstruction network; and
    S5, deploying the tested deep symmetric neural reconstruction network onto the coded aperture snapshot spectral imaging system, real-time collecting pharmaceutical measurement images using the coded aperture snapshot spectral imaging system, and performing computational reconstruction on the pharmaceutical measurement images to obtain reconstructed three-dimensional hyperspectral images; and
    wherein in the step S1, the collecting original pharmaceutical hyperspectral images using hyperspectral cameras, preprocessing the original pharmaceutical hyperspectral images to obtain preprocessed pharmaceutical hyperspectral images comprises the following steps:
    S11, presetting a band, a band interval and a hyperspectral image size to obtain a preset band, a preset band interval and a preset hyperspectral image size;
    S12, collecting the original pharmaceutical hyperspectral images using the hyperspectral cameras, selecting and combining, according to the preset band and the preset band interval, a plurality of band images from each of the original pharmaceutical hyperspectral images to obtain combined pharmaceutical hyperspectral images corresponding to the original pharmaceutical hyperspectral images respectively, and cropping, according to the preset hyperspectral image size, the combined pharmaceutical hyperspectral images to obtain cropped pharmaceutical hyperspectral images;
    S13, calculating an average clarity of each of the cropped pharmaceutical hyperspectral images; and
    S14, sorting, according to the average clarity of each of the cropped pharmaceutical hyperspectral images, the cropped pharmaceutical hyperspectral images in descending order, and selecting a top 80% of the cropped pharmaceutical hyperspectral images as the preprocessed pharmaceutical hyperspectral images.

2. The pharmaceutical hyperspectral reconstruction method based on the coded aperture snapshot spectral imaging system as claimed in claim 1, wherein in the step S13, a formula of the calculating an average clarity of each of the cropped pharmaceutical hyperspectral images is as follows:

$$D(f) = \sum_i \sum_y \sum_x |f_i(x+2, y) - f_i(x, y)|^2 \div N,$$

where D(f) represents an average clarity of a f-th cropped pharmaceutical hyperspectral image, $f_i(x, y)$ represents a grayscale value of a pixel (x, y) corresponding to a i-th band image in the f-th cropped pharmaceutical hyperspectral image, $f_i(x+2, y)$ represents a grayscale value of a pixel (x+2, y) corresponding to the i-th band image in the f-th cropped pharmaceutical hyperspectral image, N represents a number of bands in the f-th cropped pharmaceutical hyperspectral image, and i=1, 2, ..., N.

3. The pharmaceutical hyperspectral reconstruction method based on the coded aperture snapshot spectral imaging system as claimed in claim 2, wherein in the step S1, the performing data augmentation on the preprocessed pharmaceutical hyperspectral images to obtain augmented pharmaceutical hyperspectral images comprises the following steps:
    S15, rotating two-dimensional images corresponding to channels in the preprocessed pharmaceutical hyperspectral images by a preset rotation angle to obtain rotated hyperspectral images;
    S16, concatenating the preprocessed pharmaceutical hyperspectral images with corresponding rotated hyperspectral images to obtain mixed hyperspectral images; and
    S17, performing a plurality of random crops on the mixed hyperspectral images to obtain a plurality of cropped mixed hyperspectral images, and using the plurality of cropped mixed hyperspectral images as the augmented pharmaceutical hyperspectral images.

4. The pharmaceutical hyperspectral reconstruction method based on the coded aperture snapshot spectral imaging system as claimed in claim 3, wherein in the step S2, the performing simulated spatial encoding on the augmented pharmaceutical hyperspectral images to obtain encoded measurement images comprises the following steps:
    S21, randomly establishing a two-dimensional physical mask containing 0 and 1;
    S22, according to a mathematical model of coded aperture snapshot spectral imaging and the two-dimensional physical mask, performing the simulated spatial encoding on the augmented pharmaceutical hyperspectral images to obtain spatially encoded pharmaceutical hyperspectral images;

S23, performing spectral shift on the spatially encoded pharmaceutical hyperspectral images to obtain tilted data cubes; and S24, performing band fusion on the tilted data cubes and adding salt-and-pepper noise to the tilted data cubes to obtain the encoded measurement images.

5. The pharmaceutical hyperspectral reconstruction method based on the coded aperture snapshot spectral imaging system as claimed in claim 4, wherein the step S3 comprises the following steps:

S31, performing the spectral inverse shift on the encoded measurement images to obtain inversely shifted measurement images;

S32, performing the inverse encoding on the inversely shifted measurement images to obtain the inversely encoded three-dimensional hyperspectral images;

S33, using the augmented pharmaceutical hyperspectral images as the target images, and jointly using the inversely encoded three-dimensional hyperspectral images and the target images as the dataset for the supervised training; and S34, allocating 80% of the dataset as the training set for training the deep symmetric neural reconstruction network, and allocating 20% of the dataset as the testing set for testing the deep symmetric neural reconstruction network.

6. The pharmaceutical hyperspectral reconstruction method based on the coded aperture snapshot spectral imaging system as claimed in claim 5, wherein in the step S31, a formula of the performing the spectral inverse shift on the encoded measurement images to obtain inversely shifted measurement images is as follows:

$$X_{start}(:,:,c_n) = y(:, n \times \lambda_s : n \times \lambda_s + H + C - 1 - (n-1) \times \lambda_s),$$

where $\lambda_s$ represents an inverse shift step length, $X_{start} \in R^{C \times W \times H}$ represents the inversely shifted measurement images, H represents a height of a preprocessed pharmaceutical hyperspectral image, C represents a number of bands of the preprocessed pharmaceutical hyperspectral image, W represents a width of the preprocessed pharmaceutical hyperspectral image, R represents a real number, $c_n$ represents a n-th band, and $c_n = 1, 2, \ldots, C$.

7. The pharmaceutical hyperspectral reconstruction method based on the coded aperture snapshot spectral imaging system as claimed in claim 6, wherein in the step S32, a formula of the performing the inverse encoding on the inversely shifted measurement images to obtain the inversely encoded three-dimensional hyperspectral images is as follows:

$$X^1_{start}(:,:,c_n) = X_{start}(:,:,c_n) \cdot * \overline{M},$$

$$\text{where } \overline{M} = 1/M,$$

where M represents the two-dimensional physical mask, $\overline{M}$ represents a two-dimensional inverse physical mask, and $$X^1_{start}$$

represents the inversely encoded three-dimensional hyperspectral images.

8. The pharmaceutical hyperspectral reconstruction method based on the coded aperture snapshot spectral imaging system as claimed in claim 7, wherein the deep symmetric neural reconstruction network in the step S4 comprises a first residual network, a first spatial-spectral attention mechanism reconstruction module, a feature refinement module, a second spatial-spectral attention mechanism reconstruction module and a second residual network sequentially connected in that order; the first residual network is configured to extract features of the inversely encoded three-dimensional hyperspectral images, the first spatial-spectral attention mechanism reconstruction module is configured to capture global non-local spatial-spectral similarities of the inversely encoded three-dimensional hyperspectral images, the feature refinement module is configured to capture contextual feature maps of the inversely encoded three-dimensional hyperspectral images, the second spatial-spectral attention mechanism reconstruction module is configured to weight each entry of the contextual feature map to reconstruct spatial-spectral information, and the second residual network is configured to learn residual information between an input and an output and progressively refine the features.

9. The pharmaceutical hyperspectral reconstruction method based on the coded aperture snapshot spectral imaging system as claimed in claim 1, wherein in the step S1, the original pharmaceutical hyperspectral images comprise hyperspectral data with a band in a range of 300 nanometers (nm) to 2400 nm.

* * * * *